(12) United States Patent
Abusch-Magder et al.

(10) Patent No.: US 7,206,584 B2
(45) Date of Patent: Apr. 17, 2007

(54) METHODS OF DETERMINING CELLS FOR DELETION IN NETWORK DESIGN

(75) Inventors: David Abusch-Magder, Maplewood, NJ (US); John Martin Graybeal, Califon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 176 days.

(21) Appl. No.: 10/787,149

(22) Filed: Feb. 27, 2004

(65) Prior Publication Data

US 2005/0192015 A1    Sep. 1, 2005

(51) Int. Cl.
*H04Q 7/20* (2006.01)

(52) U.S. Cl. ............... 455/446; 455/422.1; 455/449

(58) Field of Classification Search ........... 455/446, 455/447, 422.1, 449, 443, 444, 435.2, 435.3, 455/436
See application file for complete search history.

(56) References Cited

U.S. PATENT DOCUMENTS

| | | | | |
|---|---|---|---|---|
| 5,179,559 A | * | 1/1993 | Crisler et al. ............... 370/332 |
| 5,907,810 A | * | 5/1999 | Subramanian et al. ....... 455/458 |
| 6,411,819 B1 | * | 6/2002 | Gutowski ..................... 455/525 |
| 6,442,393 B1 | * | 8/2002 | Hogan ....................... 455/456.5 |
| 7,013,141 B2 | * | 3/2006 | Lindquist et al. .......... 455/435.1 |
| 2002/0193111 A1 | * | 12/2002 | Wallstedt et al. ............. 455/434 |
| 2003/0190917 A1 | * | 10/2003 | De Cambray-Mathan ... 455/446 |
| 2004/0092256 A1 | * | 5/2004 | Keller et al. .............. 455/422.1 |
| 2004/0166858 A1 | * | 8/2004 | Masuda et al. .............. 455/436 |
| 2005/0032542 A1 | * | 2/2005 | Wilborn et al. .............. 455/525 |
| 2005/0048965 A1 | * | 3/2005 | Ebata .......................... 455/424 |
| 2005/0048974 A1 | * | 3/2005 | Kim et al. ................... 455/436 |
| 2005/0130655 A1 | * | 6/2005 | Lundh et al. ................ 455/434 |

* cited by examiner

*Primary Examiner*—Jean Gelin (57) ABSTRACT

A method of determining cells for deletion in a network design, in which the network is simulated to generate statistics for each cell of a given group of cells. The statistics of each cell are evaluated based on a given ranking criteria. Based on the evaluation, the cells of the grouped are ranked, with a highest ranked cell being deleted from the network design based on the ranking criteria. The method may enable the selecting of desired cells for deletion, either during site selection of a design for an initial network deployment, or for a network overlay and upgrade of an existing network, in an effort to reduce cell count while maintaining a desired cell coverage in the network.

30 Claims, 9 Drawing Sheets

METHODS OF DETERMINING CELLS FOR DELETION IN NETWORK DESIGN

BACKGROUND OF THE INVENTION

1. Field of the Invention

The present invention relates generally to determining cells for deletion in a network design.

2. Related Art

The development of newer generations of technologies has created an opportunity and requirement for wireless providers to upgrade their networks (e.g. $2^{nd}$ generation to $3^{rd}$ generation such as GSM to UMTS, IS-95 to cdma2000, etc.), while market forces require them to maximize the use of their capital and preexisting investments. Upgrades in technology not only offer additional services but also performance enhancements, which give an operator the opportunity to achieve comparable network wide coverage with fewer cells. In wireless communications systems, large geographical areas are segmented into many smaller areas, i.e., cells, each cell having its own radio transmitters and receivers and one or more controllers interconnected with a public switched telephone network (PSTN) for example. A network may be composed of a plurality of cells, each cell having a plurality of sectors, for example. The choice of which cells to be deleted from a network overlay to be used to effect the upgrade typically depends on planning and design of the network. A network overlay may be defined as new services or enhancement that can be implemented atop the existing network infrastructure to upgrade the existing network, for example (i.e., enhancements to upgrade a 2G network to a 3G network).

Although textbook networks are often configured in a perfect or 'regular' hexagonal array which achieves optimal coverage, such designs rarely, if ever, exist in actual networks. Designers must contend with many factors that make such regular arrays no longer optimal or possible when designing a network for initial deployment or network overlay.

For example, in actual networks, inhomogeneity is inherent. The influence of inhomogeneity on a real or actual network may be caused by terrain, non-uniform traffic distribution, clutter, and the need for site acquisition (real estate acquisition and zoning requirements significantly limit the set of potential cell sites), etc. In an inhomogeneous network, unlike an ideal or textbook network, the removal of a given cell in the network has different, and possibly undesirable, effects on the network. Accordingly, a problem in designing a network, either during site selection for initial network deployment (sometimes referred to as 'greenfield' deployment, where sites are considered for possible deletion to determine those sites which remain and that will eventually be deployed), or during network overlay when upgrading a network to a different technology, is to intelligently determine which cells to remove so that an operator may reduce the cell count of a network design with minimal, if any, performance penalty.

Current efforts have focused primarily on site selection of cells during initial network design and deployment, typically using simulated annealing techniques, and evolutionary algorithms, with little mention of using a greedy heuristic. In the greedy heuristic, all cells are evaluated on a cell-by-cell basis (one at a time) for possible deletion, and the cell with the lowest performance penalty is selected. Further deletions may be obtained by repeating the process and testing all remaining cells.

Like simulated annealing and genetic algorithms the greedy heuristic itself has computational difficulties. For example, in order to delete 1 of M cells, the greedy algorithm requires M separate evaluations, and hence M network simulations. Moreover, the aforementioned simulated annealing techniques, evolutionary algorithms and greedy heuristic algorithms have not focused on which cells to delete during a network overlay, and the site selection literature has only given superficial treatment to the role that inhomogeneity may play in network planning and design.

SUMMARY OF THE INVENTION

The exemplary embodiments of the present invention provide methods for determining cells for deletion in a network design. The methods may enable the selection of desired cells for deletion, either during site selection of a design for an initial network deployment, or for a network overlay and upgrade of an existing network, in an effort to reduce cell count while maintaining a desired cell coverage in the network with minimal computational cost.

An exemplary embodiment of the present invention is directed to a method of determining cells for deletion in a network design. In the method, the network is simulated to generate statistics for each cell of a given group of cells. The statistics of each cell are evaluated in accordance with a given ranking criteria. Based on the evaluation, the cells of the group are ordered by rank, with a highest ranked cell being deleted.

Another exemplary embodiment of the present invention is directed to a method of determining cells for deletion in a network design in which the network is evaluated without the deleted highest ranked cell, in order to determine the influence the deleted cell has on the network. After the highest ranked cell has been deleted, a network parameter related to deletion of the highest ranked cell is evaluated against a given screening criteria to determine the influence the deleted cell has on the network. The deletion of the highest ranked cell is allowed if the network parameter satisfies the screening criteria, otherwise the deletion is rejected and a next (and possibly subsequent) highest ranked cells are deleted, and the network evaluated until the network parameter for a given ranked cell satisfies the screening criteria.

Another exemplary embodiment of the present invention is directed to a method of determining cells for deletion as part of a network upgrade of an existing, live network. In this method, actual network data is collected for each cell of a given group of cells within a live network, and the generated data of each cell is evaluated based on a given ranking criteria. Based on the evaluation, the cells are ordered by rank and the highest ranked cell is deleted from the live network.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention and wherein.

DETAILED DESCRIPTION OF THE EXEMPLARY EMBODIMENTS

Although the following description relates to a network based on one or more of CDMA (IS95, cdma2000 and various technology variations), UMTS, GSM, 802.11 and/or related technologies, and will be described in this exemplary context, it should be noted that the exemplary embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

As used herein, mobile or mobile user are synonymous to user equipment (UE), user, subscriber, wireless terminal and remote station and describe a remote user of wireless resources in a wireless communication network.

The exemplary embodiments of the present invention envision methods for determining which cells to delete during an initial network deployment or during a network upgrade, for example. Simulated examples provided herein may illustrate how opportunities for cell deletion increase with the amount of inhomogeneity. The methods described hereafter may be applied in a simulated network environment or by using actual network parameters from a live, existing network.

In general, in order to determine or select cells for deletion in accordance with the exemplary embodiments, a network may be simulated, and statistics compiled on a cell-by-cell basis. The cells may be ordered by rank based on a evaluation of the statistics in accordance with a given ranking criteria, and a highest ranked cell chosen for deletion. For additional deletions, the method may be repeated to achieve a desired deletion of N cells, for example. The methods described herein may be used independently of simulation models adopted to simulate the network, so long as network data (cell-by-cell data, or more detailed data) are available.

As will be seen in further detail below, the method may thus take advantage of the effects of inhomogeneity inherent in an actual network (i.e., terrain of the proposed network, non-uniform traffic distribution within the proposed network, potential clutter in the proposed network and site selection requirements introduced by real estate and zoning restrictions, etc.) during a network design phase.

Particularly, network inhomogeneity is considered when evaluating desired cell coverage in a proposed network design to determine cells for deletion in the proposed network design. Intelligent cell deletion may thus be performed taking into account this inhomogeneity, ostensibly by ordering cells by rank based on a evaluation of statistics generated, for each cell, to a given ranking criteria, and by deleting the highest ranked cell. Alternatively, the statistics may be based on actual network data for each cell of a given group of cells of a live network, instead of being generated from a network simulation. Further, only a single simulation of the proposed network design need be performed to determine a given cell for deletion.

Figure 1:
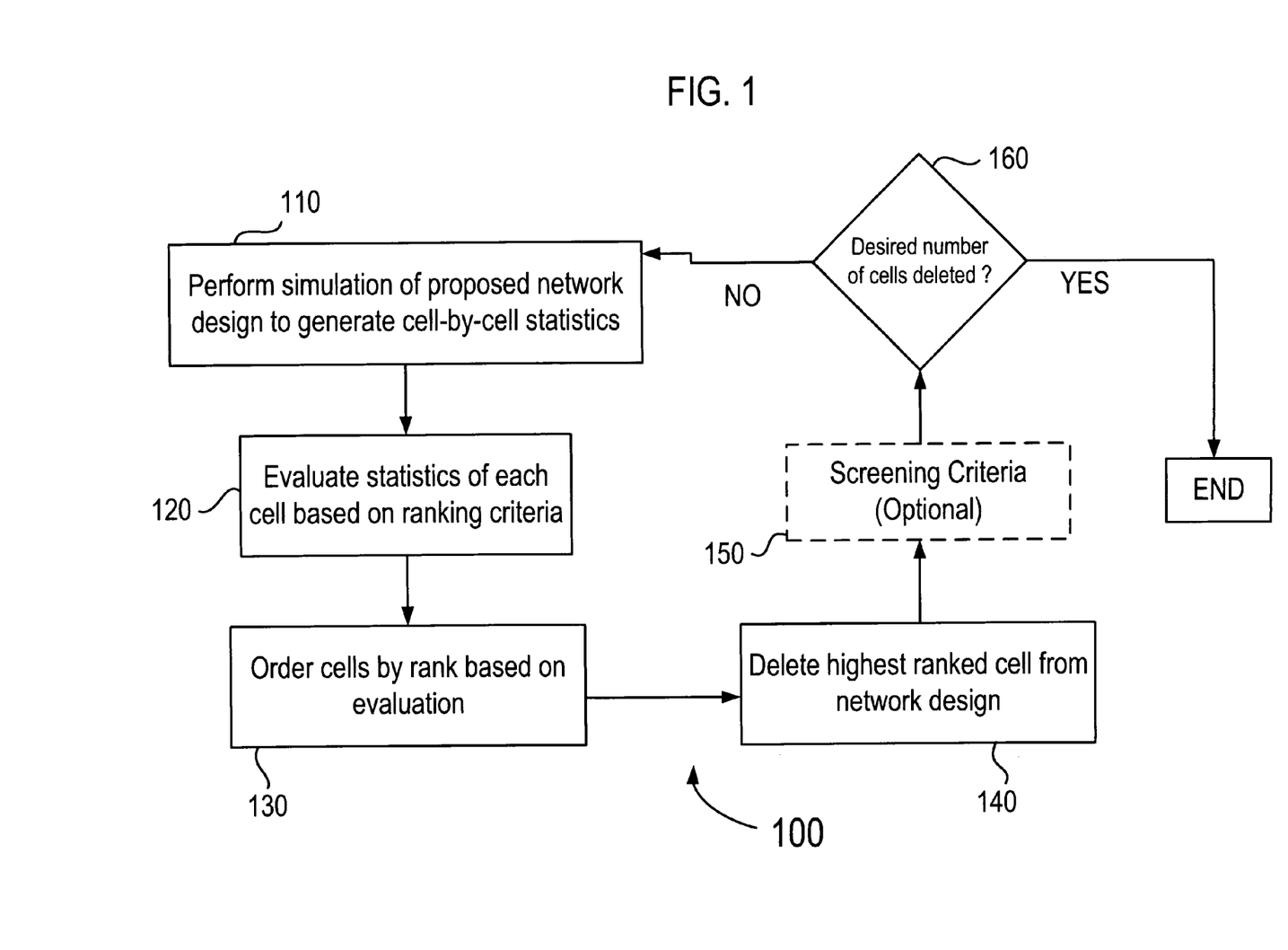
FIG. 1 is a flowchart for describing a method of determining cells for deletion in a network design in accordance with an exemplary embodiment of the present invention.

FIG. 1 is a flowchart for describing a method of determining cells for deletion in a network design in accordance with an exemplary embodiment of the present invention. Referring to FIG. 1, as part of method 100, a network may be simulated (function 110) to generate statistics for each cell of a given group of cells. Only a single simulation need to be performed to choose a cell for deletion in FIG. 1. The generated statistics may be statistics related to a number of soft handoff legs for each cell of the group, total active legs for each cell of the group, and total number of simplex and softer-handoff legs for each cell of the group, for example, although these are only exemplary statistics.

The statistics of each cell may be evaluated in accordance with a given ranking criteria (function 120) to achieve a 'score' for each cell. Based on the ranking criteria, the cells may be ordered by rank (function 130), with a highest ranked cell being deleted (function 140) from the network design.

Functions 110–140 may be repeated until a desired amount of N cells have been deleted. For example, an operator may have a desired cell coverage or capacity for a network design, and may delete cells to obtain a cell count that maintains the desired cell coverage or capacity.

The cells being evaluated for ordering by rank may not necessarily be all cells in the network. Rather a subset or selected group within the network may be evaluated. The operation may also specify which cells can be deleted, and other cells that cannot be deleted. The operator may thus desire to consider certain cells for deletion from a particular region, but may simulate a broader region of the network. Or the operator may choose some cells (based on knowledge of the network) that are not candidates for deletion, such as cells that cover specific high density areas for desired coverage, such as shopping malls, highway interchanges prone to traffic jams, or specific buildings, etc.

Many different ranking methods may be employed as the ranking criteria for function 120. The following two examples may be referred to as 'method-1' and 'method-2' for simplicity. Method 1 deletes the cell with the highest ratio of soft handoff legs to total active legs, while method-2 deletes the cell with the lowest number of simplex legs and softer-handoff legs, a leg being defined as an active connection between a cell and a mobile. If the mobile is connected to more than one cell, each of its legs are considered to be in soft-handoff, if a mobile only communicates with one sector within a cell the leg is considered a simplex leg, while if it communicates with two sectors within a single cell the legs are considered to be in softer-handoff.

Both method-1 and method-2 are designed to find cells whose deletion abandons the minimum number of mobiles by biasing against cells with many simplex and softer handoff legs, since mobiles with a simplex and softer-handoff connection to a cell might lose coverage when that cell is deleted. Furthermore, by changing the method used for ranking cells, the exemplary deletion methods may be modified to incorporate "engineering judgment". For example, method-1 avoids the elimination of rural cells despite their low traffic, since rural cells are likely to have a high proportion of simplex and softer-handoff legs. Such considerations may be particularly pertinent when analyzing and designing actual networks.

The ranking criteria described above is merely exemplary. A ranking criteria may be used that evaluates, for each cell, a lowest value of a parameter such as the product of the total traffic and the average broadcast power per user, for example, so that cells may be ordered by rank from highest to lowest based on a lowest value for the above parameter. Accordingly, a ranking criteria may be based on any number of parameters of the cell or network, depending on desired coverage or capacity for a given network design.

Rankings may be determined based on other types of data derived from simulation of the network other than the statistics described above. For example, statistical data may be generated at a finer level (say for each spatial bin, or for each mobile user), and a ranking criteria may be based on those finer data to rank the cells for deletion. In this case too, only a single network simulation is needed, keeping the computational cost low.

The highest ranked cell could be the cell that has the lowest adverse effect on a given mobile population, based on calculation of a communication parameter such as an average signal to interference ratio (SIR) (an example being the ratio of pilot channel power to interference) values of mobiles in the cell. Alternatively, the statistics may be related to data for a given spatial bin (i.e., an area of the network that is being simulated is divided into spatial bins). The effect of deleting cells may be assessed by using bin data or mobile data to estimate the impact of each possible cell deletion. For example a calculation based on data from those bins may estimate which cell could be deleted with minimal adverse effect on performance, and thus might be an acceptable candidate for deletion. The ranking criteria may be based on a threshold value for the bin data or mobile user data, such as SIR or total received signal strength. Further, the degree that all the mobiles in a given cell have an SIR or signal strength value that exceeds a threshold could be evaluated. In this example, the cells may be ranked, based on the degree to which the aggregate of bin data or mobile user data in communication with that cell exceeds the threshold. In such a case, the highest ranked cell may be the cell having bin data or mobile user data exceeding the threshold to the highest degree; this being only one example.

Figure 2A:
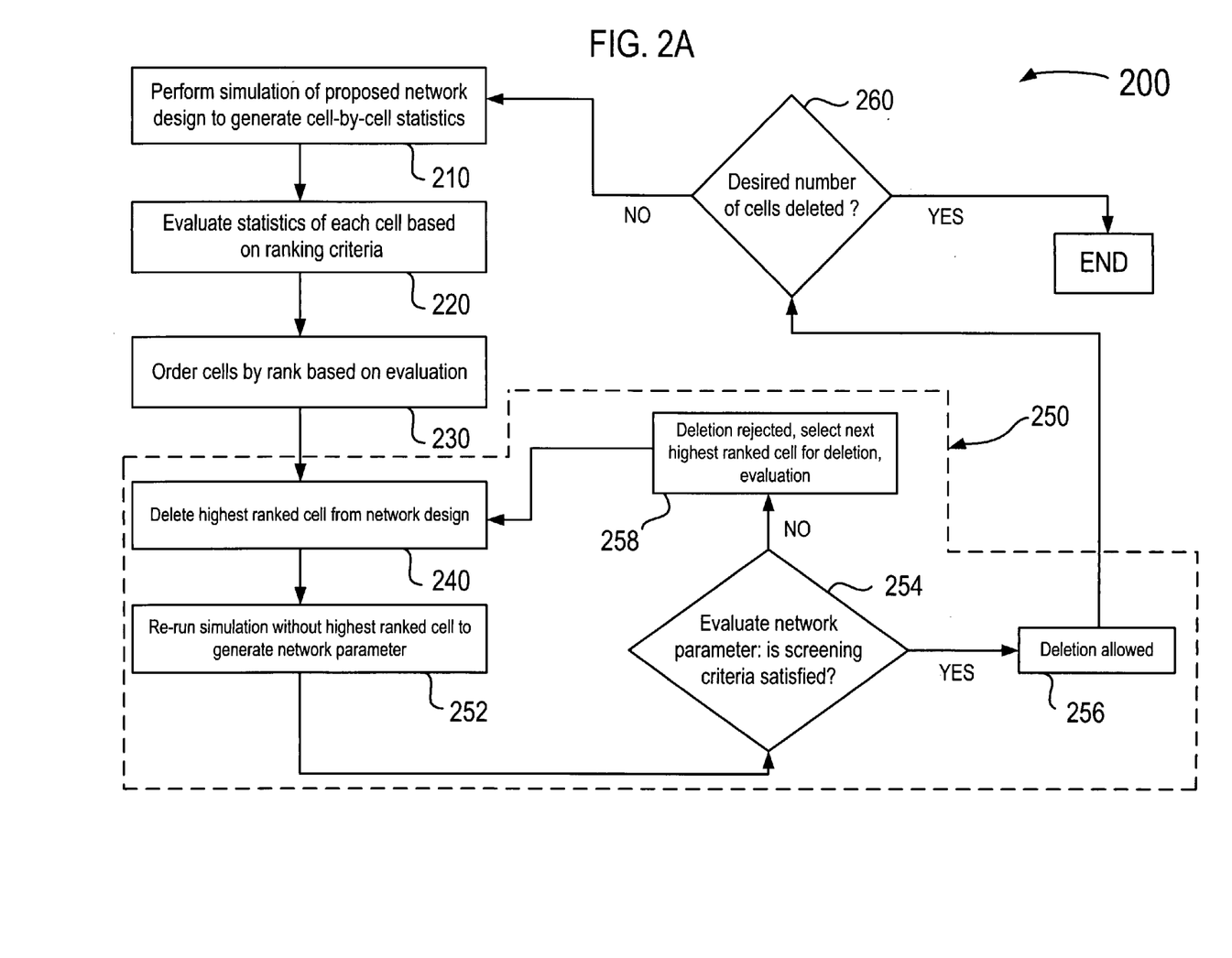
FIGS. 2A and 2B are flowcharts for describing a method of determining cells for deletion in a network design in accordance with another exemplary embodiment of the present invention.
Figure 2B:
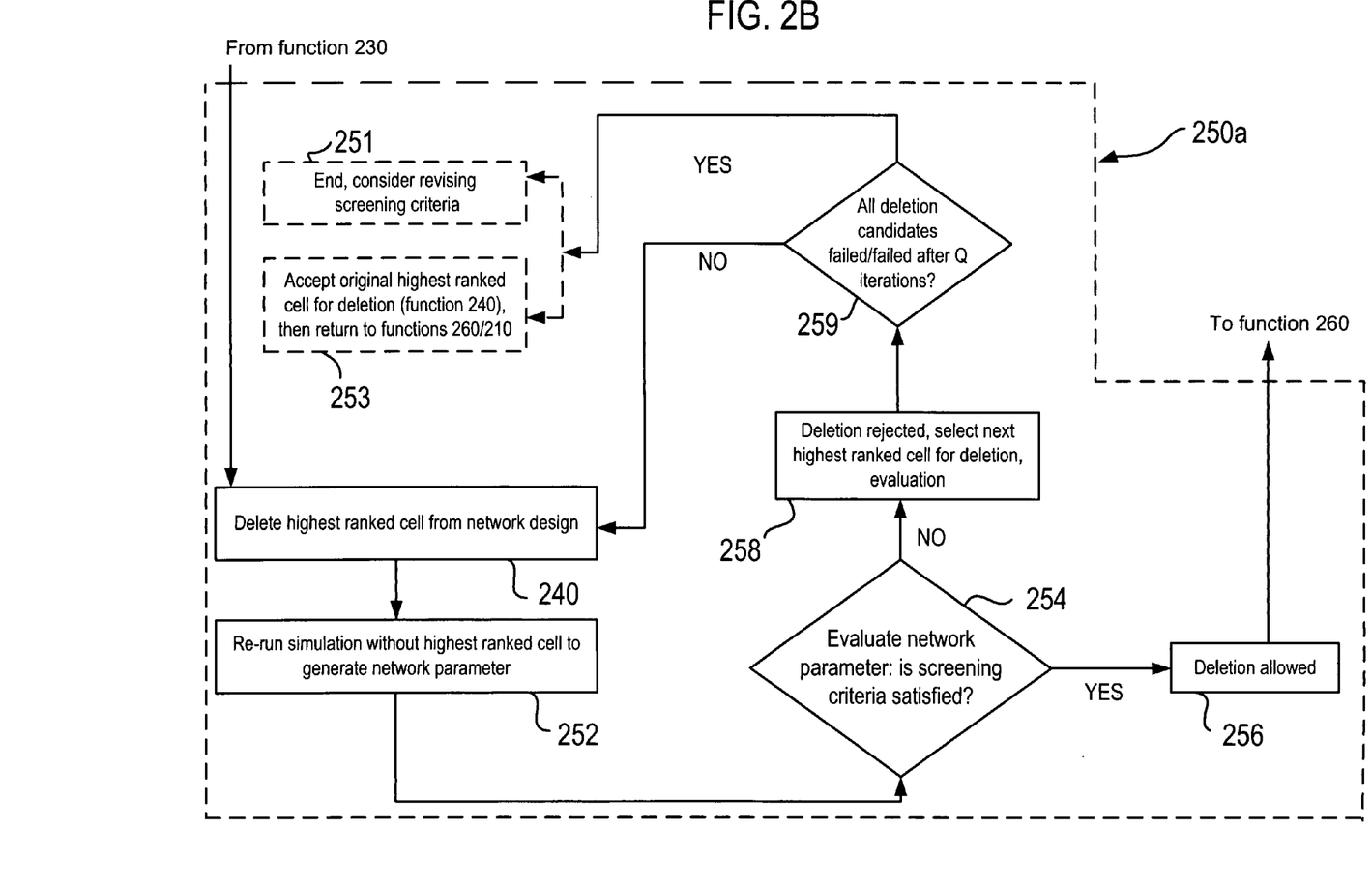

FIGS. 2A and 2B are flowcharts for describing a method of determining cells for deletion in a network design in accordance with another exemplary embodiment of the present invention. Referring to FIG. 2, functions 210–240 mirror functions 110–140 of FIG. 1 and are thus not described here in detail for reasons of brevity. Similar to FIG. 1, the initial ranking criteria in function 230 may employ either method-1 or method-2, or another ranking criteria to rank the cells. Thus, a detailed description of these ranking criteria are similarly omitted here for brevity. Further, cell statistics or mobile/network parameters may be used as data for the evaluation function 220, as described above.

Method 200 selects cells for deletion in a network design, in which the network is then re-simulated without the deleted highest ranked cell, so as to determine the influence the deleted cell has on the network. Referring to FIG. 2A, as part of screening criteria (function) 250, the highest ranked cell is deleted (function 240), the network is re-simulated (function 252) and a network parameter related to deletion of the highest ranked cell is evaluated (function 254) against a given screening criteria to determine the influence the deleted cell has on the network. The deletion of the highest ranked cell is allowed (function 256) if the network parameter satisfies the screening criteria, otherwise the deletion is rejected (function 258) and the effects of deletion of a next highest ranked cell (and/or subsequent deletion candidates) is evaluated (functions 240, 252, 254 repeated). This may repeat until the network parameter for a given ranked cell (i.e., deletion candidate) satisfies the screening criteria, such that a deletion candidate is approved for deletion from the network design at function 256.

Thus, in this exemplary embodiment, a screening criteria may be used to gauge the impact that the deleted highest ranked cell has on the network, to decide whether that impact is acceptable based on a network parameter. The network parameter may be the network coverage of the group, or an individual cell coverage, for example, although cell capacity could also be the evaluated parameter. A exemplary screening criteria may be whether a particular area is covered after deletion of the candidate cell. Alternatively an exemplary screening criteria may be whether the deletion of the candidate cell reduces the normalized network coverage of the group of cells by less than P%, P being a selectable parameter (i.e., 0.2%, 1.5%, etc.). For example, P might be 1%.

In the case where cell capacity is evaluated as a network parameter, the screening criteria may be whether the network capacity is reduced by less than P%. These are only exemplary techniques to qualify the effect that deletion of a cell has on the network. Another example of a screening criteria may be based on more detailed data. For example, an alternative screening criteria might determine whether cell coverage still existed for a particular location such as an heavily trafficked highway exit or a convention center. In this case, if a deletion candidate left such a high density area uncovered, the deletion candidate would be rejected.

Thus, if the cell passes the screening criteria, the deletion is allowed to remain, and steps 210–250 may be repeated until a desired number of N cells are deleted. The advantage of this screening criteria is that it allows a designer to rank cells using a relatively expedient process, yet permits rejection of solutions that, upon more precise investigation, are found to be lacking.

FIG. 2B is somewhat similar to the screening criteria 250 of FIG. 2A, but illustrates a modification to the screening criteria to account for a worst case scenario in which many or all deletion candidates fail the screening criteria based on function 254. In the modified screening criteria 250a, if the output of function 254 is NO, the deletion is rejected at function 258. However, instead of proceeding immediately to the next highest ranked cell as a deletion candidate, the method may allow the operator to possibly terminate the deletion process. In such a scenario, if all deletion candidates have failed (function 259) or if Q deletion candidates have failed in a row (where Q is selectable by the operator) the operator may terminate the process at function 251, perhaps to reevaluate or modify the screening criteria. The point of this decision may be after a fixed number of iterations (e.g., Q), or at the point that all of the possible candidates have failed to pass the screening criterion. This may be merely one option (box of function 251 shown in dotted line format as optional). The operator may alternatively choose to accept the original highest ranked cell for deletion despite the original highest ranked cell's failure to pass the screening criteria (function 253) and return to functions of the 'outer' loop (function 260 and hence function 210–250).

Figure 3:
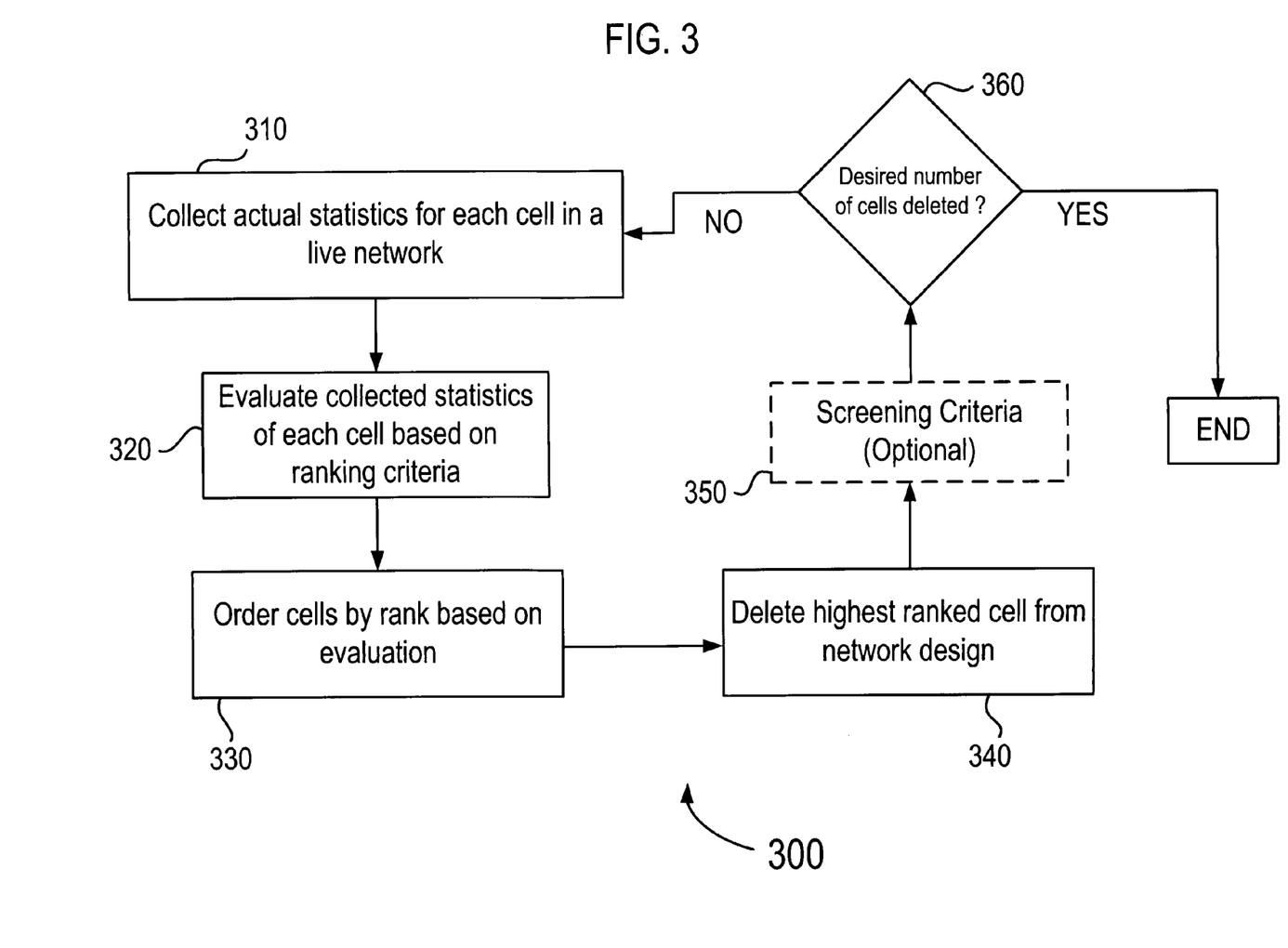
FIG. 3 is a flowchart for describing a method of determining cells for deletion in a network design in accordance with another exemplary embodiment of the present invention.

FIG. 3 is a flowchart for describing a method of determining cells for deletion in a network design in accordance with another exemplary embodiment of the present invention. So far, the methods have been described in terms of generating statistics based on a network simulation. It may also be possible to base a deletion decision on data compiled from a live network. Such data may be recorded in log files stored by the networking equipment, for example. This would not be as fast a process as that described in FIG. 1, since after each deletion, new network statistics would need to be generated and then gathered from the log files to see how the network is behaving after the single cell deletion. However, the method described in this present exemplary embodiment would be very accurate since the operator is using actual, real data from the network and not statistics generated by a network simulator.

The functions outlined in FIG. 3 are similar to those outlined in FIGS. 1 and 2, thus only the differences are described. Referring to FIG. 3, actual network data is collected (function 310) for each cell of a given group of cells of the live network. This collected statistics for each cell is evaluated (function 320) in accordance with a selected ranking criteria (method-1, method-2, etc) to obtain the aforementioned score. The cells are ordered by rank (function 330) based on the evaluation and the highest ranked cell is deleted (function 340) from the live network.

As in FIG. 1, function 320–340 may be repeated until a desired amount of N cells have been deleted. Somewhat similar to FIG. 2, revised network statistics for each cell may be collected after deletion of the highest ranked cell from the network, and the influence of the deleted highest ranked cell may be determined based on the collected statistics. For example, the revised network statistics may be a suitable network parameter such as cell coverage or capacity, and a suitable screening criteria (function 350) may be employed to qualify whether the deletion of the highest ranked cell is acceptable in terms of the impact on network performance.

Comparison to Greedy Heuristic

To evaluate the performance of the methods of determining cell deletion in accordance with the exemplary embodiments, the inventors compared performance of the methods to the greedy heuristic. As discussed above, and unlike the exemplary embodiments, in the greedy heuristic, all of the cells are evaluated one at a time for possible deletion, and the cell with the lowest reduction in coverage is selected; further deletions are obtained by repeating the process and testing all remaining cells.

In addition to any differences in the network coverage obtained from the two different approaches, the exemplary methods and the greedy heuristic differ in computational difficulty. For example, to delete 1 of M cells, the exemplary embodiments require a single evaluation of the network, while the greedy algorithm requires M separate evaluations. When using the algorithm with screening (FIGS. 2A–2B) the computational cost will be between these two limiting cases depending on the stringency of the screening criteria. To delete N of M cells the process is repeated N times as shown in FIG. 1 (function 160). In any case, the savings in computation time afforded by the exemplary embodiments as compared to the greedy heuristic are a function of the number of desired cells for deletion. Treating an evaluation of the network as the fundamental computational step (regardless of the data reported by the network simulator), the methods in accordance with the exemplary embodiments runs at approximately M times faster than the greedy heuristic. As will be seen further below, and as a control, the results of both algorithms were compared to the average performance of a network whose cells are deleted at random.

SIMULATED EXAMPLES

To test the performance of the methods described above, and to highlight the role of inhomogeneity in the tradeoff between cell coverage and cell count, the inventors performed several simulations. Coverage is evaluated in both the forward and reverse-link, including both pilot ($E_c/I_0$) and traffic channel ($E_b/N_0$) requirements. Since a pre-existing network was assumed to exist (as in a network upgrade), the cell sites are considered to be fixed; thus we did not consider the possibility of acquiring additional sites. The simulations presented below used typical 3G-1X voice parameters and flat terrain, with the understanding that the approach is general and can be applied to other technologies (UMTS, IS-95, etc.) and to other services (such as high speed data).

Figure 4:
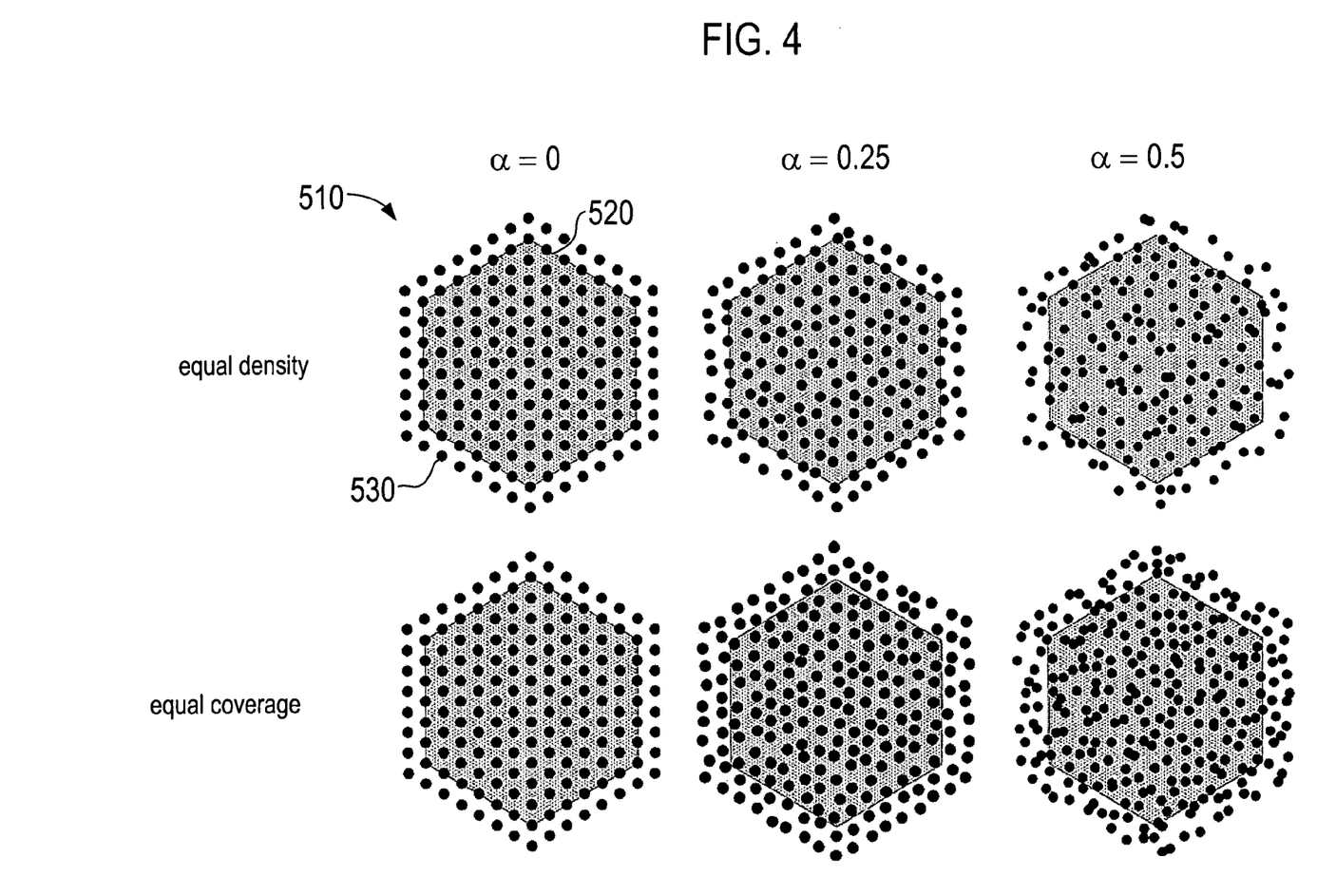
FIG. 4 illustrates an exemplary modeling of the effects of inhomogeneity introduced into a network through the constraints of cell site placement for the network.

FIG. 4 illustrates an exemplary modeling of the effects of inhomogeneity introduced into a network through the constraints of cell site placement for the network. FIG. 4 illustrates two rows of three markets, a top row having equal cell density, and a bottom row having equal cell coverage. The market shown in the upper left corner consists of a hexagonal array 510 of 169 cells separated by $r_s$=4 km. Region 520 shows the uniform traffic density having a given cell coverage, while the dots 530 represent cell sites with omni-directional antennas. Cells inside the region 520 are considered for possible deletions (91 candidates), while the outer cells (which broadcast at fixed power) provide a uniform interference environment.

Network inhomogeneity may be introduced by randomly offsetting the position of each cell so that it has a uniform probability of occupying a disk of size $\alpha r_s$ about its position in the regular array. The term '$\alpha$' is a measure of the inhomogeneity ('inhomogeneity factor') in these simulations. As $\alpha$ is increased with fixed cell density (the markets in the top row of Table 1 and FIG. 4) the inhomogeneity increases and the coverage decreases. If the operator wishes to maintain the same value of coverage, the cell density must increase to compensate for the inhomogeneity (as seen in the bottom row of Table 1 and in FIG. 4).

All the markets shown in the bottom row have coverage ≈94.3%. As the inhomogeneity is increased, the density of cells must be concomitantly increased to maintain the coverage. This is summarized in Table 1 below. The two markets with $\alpha$=0 (leftmost column) are identical, and different realizations of inhomogeneity with the same values of $\alpha$ tend to substantially similar cell coverage (less than 0.5% variation).

TABLE 1

|  | α = 0 | α = 0.25 | α = 0.5 |
|---|---|---|---|
| equal density | coverage of 94.3% 7.2 cells/100 km$^2$ | coverage of 89.8% 7.2 cells/100 km$^2$ | coverage of 82.0% 7.2 cells/100 km$^2$ |
| equal coverage | coverage of 94.3% 7.2 cells/100 km$^2$ | coverage of 94.2% 8.4 cells/100 km$^2$ | coverage of 94.4% 10.8 cells/100 km$^2$ |

Figure 5:
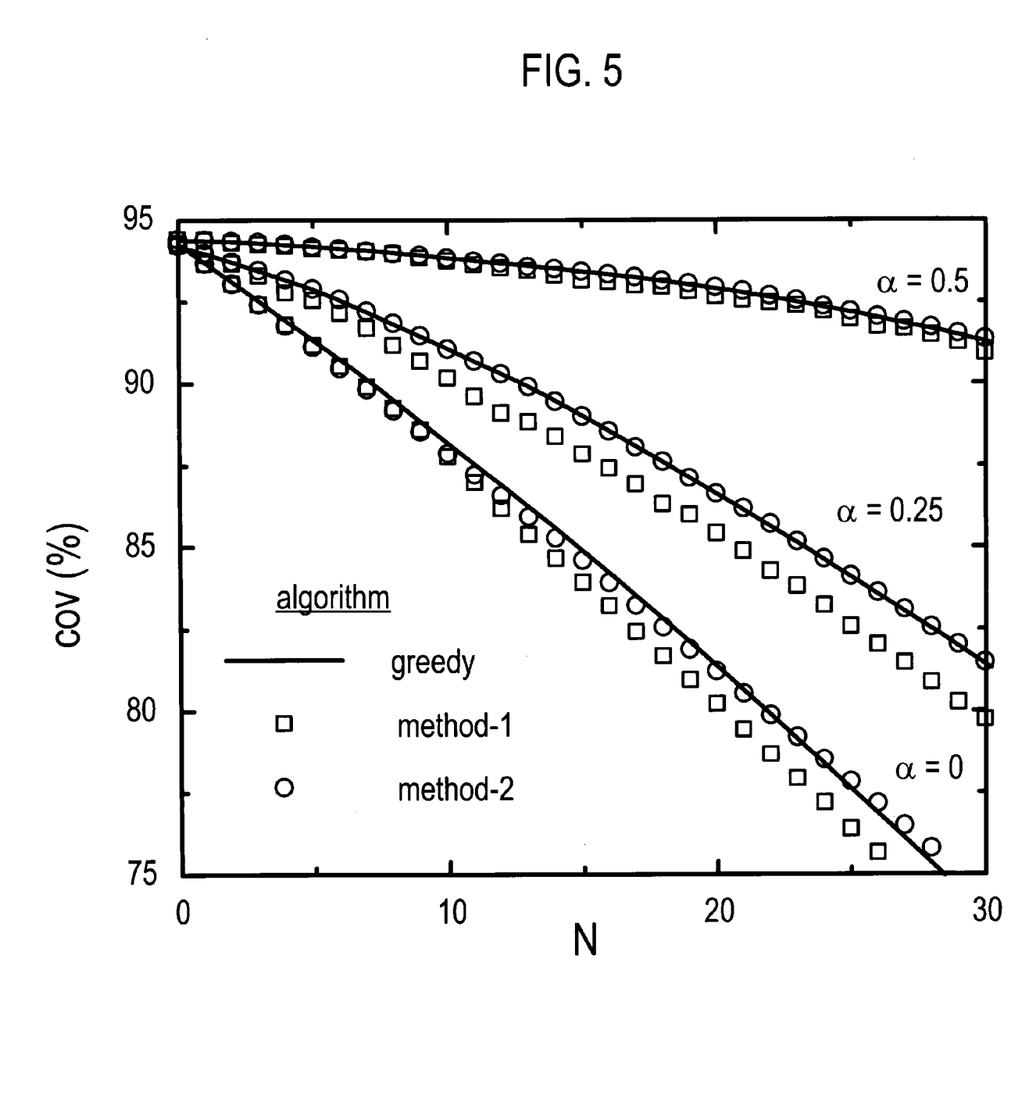
FIG. 5 is a graph illustrating cell coverage versus the number of cells deleted, N, and various inhomogeneity factors (α) to evaluate the greedy heuristic and the methods of deleting cells in accordance with the exemplary embodiments of the present invention.

FIG. 5 is a graph illustrating cell coverage versus the number of cells deleted, N, and various inhomogeneity factors (α) to evaluate the greedy heuristic and the methods of deleting cells in accordance with the exemplary embodiments of the present invention.

In FIG. 5, three sets of curves are shown for each of α=0, 0.25, and 0.5: the greedy algorithm is plotted as a line, and the methods in accordance with the exemplary embodiments are plotted with symbols. The slope of the curves is shallower the larger the inhomogeneity (α), thus clearly demonstrating that the cell coverage penalty for removing a cell may be actually reduced with greater inhomogeneity. The method employing method-2 for ranking produced results that were nearly indistinguishable from the greedy heuristic and for this particular example runs at about >50 times faster (hours vs. days) than the greedy heuristic.

Thus, FIG. 5 illustrates that the greater the inhomogeneity (α) the shallower the slope of the coverage vs. N curve, the lower the coverage penalty for each cell deleted, and the more cells can be deleted for the same coverage penalty. As can be seen in FIG. 5, the results for the methods in accordance with the exemplary embodiments and the greedy heuristic are nearly identical.

Figure 6:
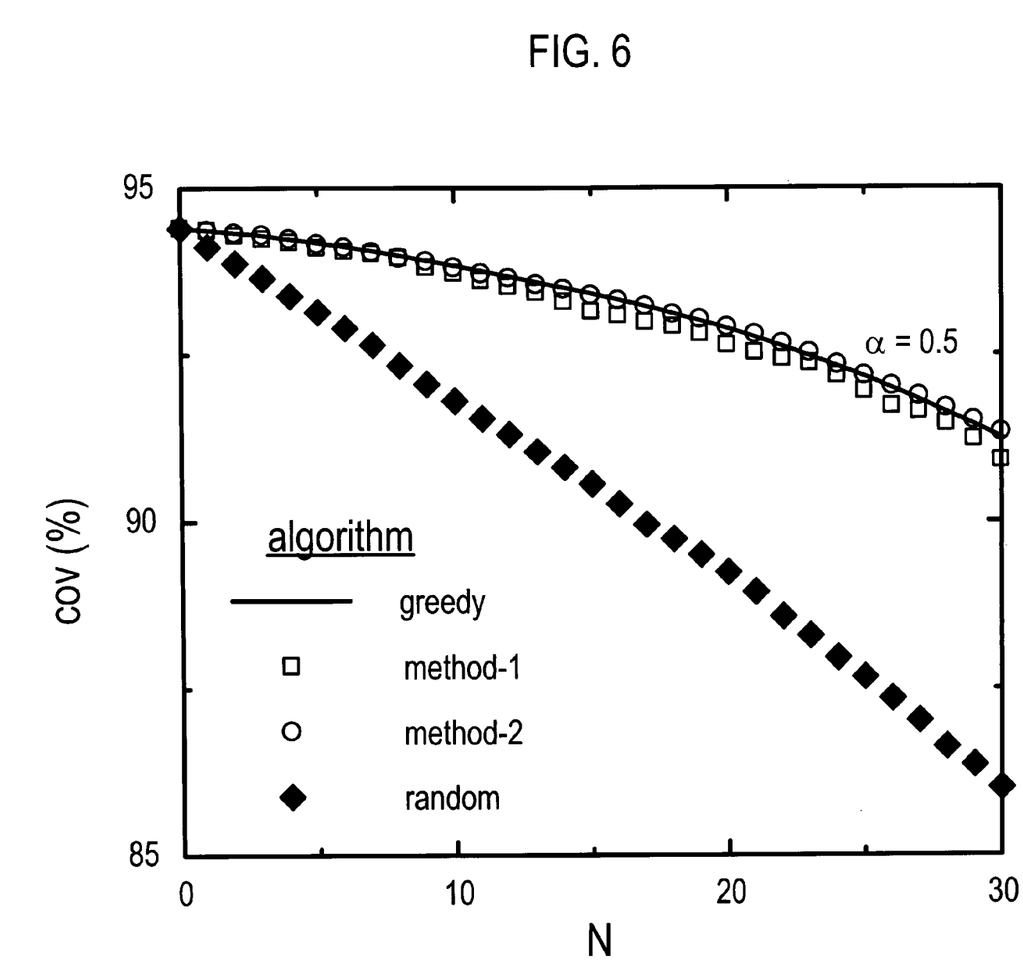
FIG. 6 is a graph illustrating cell coverage versus the number of cells deleted, N, and inhomogeneity factor (α=0.5) to compare the results of the greedy heuristic, random cell deletion, and the methods of deleting cells in accordance with the exemplary embodiments of the present invention.

FIG. 6 is a graph illustrating cell coverage versus the number of cells deleted, N, and inhomogeneity factor (α=0.5) to evaluate the greedy heuristic, random cell deletion, and the methods of deleting cells in accordance with the exemplary embodiments of the present invention.

In FIG. 6, cell coverage vs. N for cell deletions chosen at random have been plotted in an effort to highlight the effectiveness of the methods in accordance with the exemplary embodiments and the greedy heuristic. In FIG. 6, the solid diamonds represent the coverage values if the deleted cells are chosen at random (several sets of random deletions have been averaged). The top three curves in FIG. 6 are identical to the top curves for α=0.5 in FIG. 5, and demonstrate that the methods in accordance with the exemplary embodiments are as effective as the greedy heuristic in reducing or possibly eliminating the cell coverage penalty for cell deletion. The top three curves' contrast with the bottom curve demonstrates the effectiveness of the exemplary embodiments as compared to random deletion.

Figure 7:
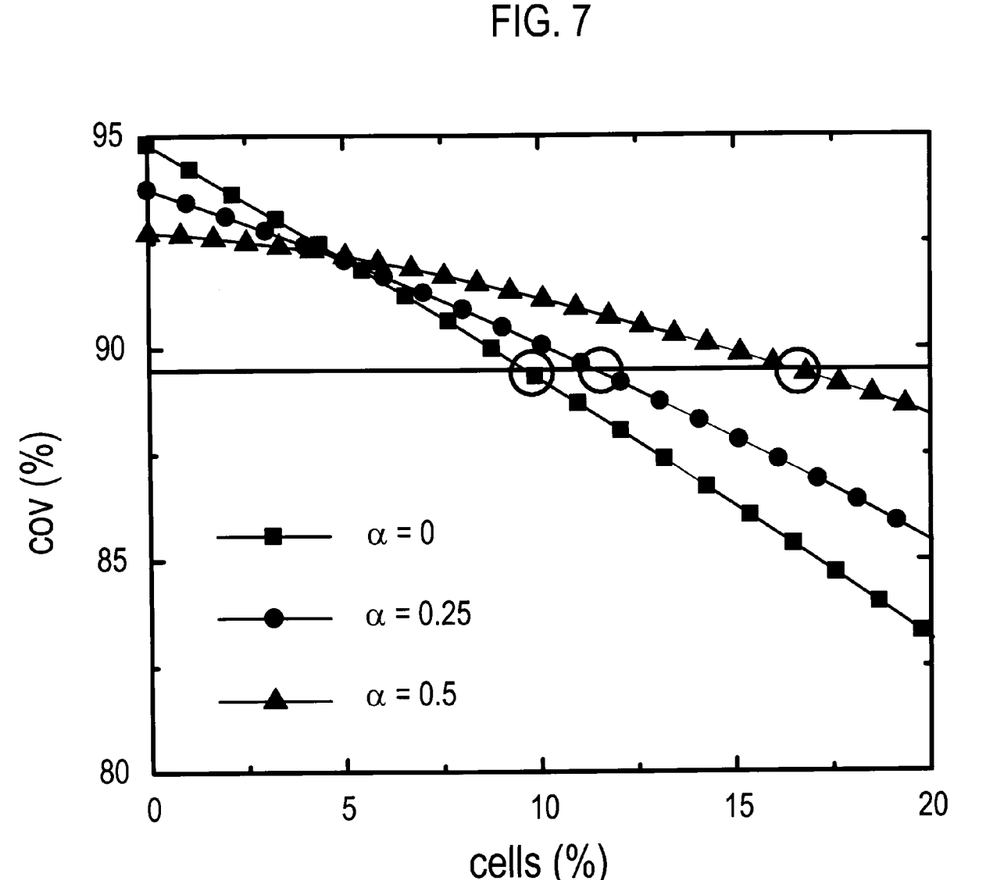
FIG. 7 is a graph illustrating cell coverage versus the number of cells deleted, N, and various inhomogeneity factors (α) to illustrate results of simulation of a technology upgrade and network overlay, in accordance with the exemplary embodiments of the present invention.

FIG. 7 is a graph illustrating cell coverage versus the number of cells deleted, N, and various inhomogeneity factors (α) to illustrate results of simulation of a technology upgrade and network overlay, in accordance with the exemplary embodiments of the present invention.

To simulate a network upgrade, three networks with varying degrees of inhomogeneity were analyzed. Each network began with an equal coverage of ≈89.5% (horizontal line in FIG. 7) before interference was reduced so as to mimic a network upgrade. Such a reduction in the interference may result from an upgraded technology that has better power control algorithms, or enhancements in signal processing, for example. The reduced interference increases the cell coverage in all three networks, and cells were deleted until the initial value of cell coverage was recovered. The greater the inhomogeneity, the greater the opportunity for deletion: in this example 9.5% (for α=0), 11.5% (for α=0.25), and 16.5% (for α=0.5) of the cells were deleted.

FIG. 7 illustrates that the greater the inhomogeneity, the greater the proportion of cells that can be removed during an upgrade. In FIG. 7, the cell count has been normalized to the market size to factor out the increased density that may be required to maintain equal coverage in markets with more inhomogeneity.

Figure 8:
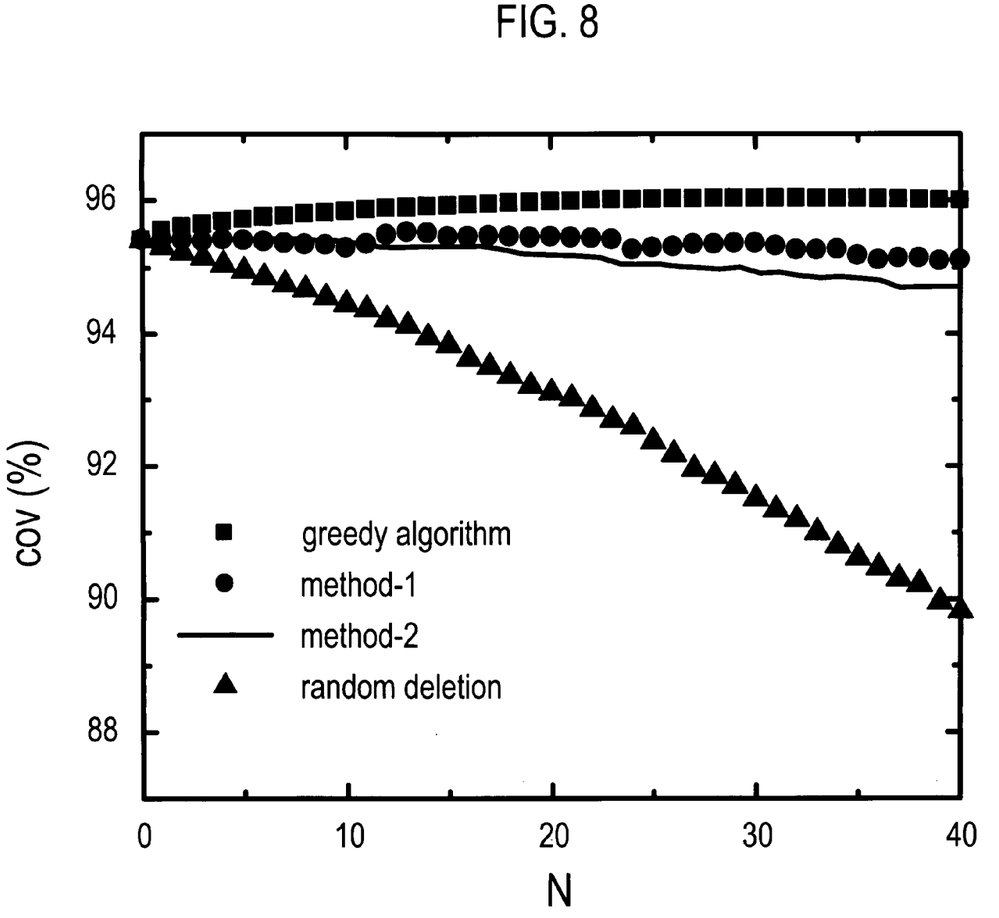
FIG. 8 is a graph illustrating cell coverage versus the number of cells deleted, N, to illustrate a realistic example of a 2G to 3G network upgrade, in accordance with the exemplary embodiments of the present invention.

FIG. 8 is a graph illustrating cell coverage versus the number of cells deleted, N, to illustrate a realistic example of a 2G to 3G network upgrade, in accordance with the exemplary embodiments of the present invention. In FIG. 8, performance of 190 cells in a 2G-like network were simulated with 3G-1X voice parameters. In this real world example, inhomogeneity is due to non-uniform traffic distribution, terrain, as well as cell site placement. The key in FIG. 8 illustrates curves for the greedy algorithm, random deletion (the average effect of deleting cells at random) and the exemplary embodiments of the present invention using method-1 and method-2 as ranking criterion.

As shown in FIG. 8, the methods of the present invention had acceptable performance as compared to the greedy heuristic and ran about 150 times quicker (several hours vs. several weeks). The resultant cell coverage was just slightly lower than that of the greedy heuristic. The method of deleting cells in accordance with the exemplary embodiments of the present invention using either ranking method-1 or ranking method-2 found a solution with significantly higher capacity than that of the greedy algorithm's design. This difference is due to the engineering judgment that went into the selection of the ranking criteria (e.g., method-1 and method-2). Engineering judgment (or judgment of the skilled operator or designer developed in part based on experience) may thus be employed when selecting the ranking criteria (and screening criteria) for the method in order to qualify the ranking of the cells. Additionally the methods in accordance with the exemplary embodiments can even be implemented using cell based statistics compiled during the operation of a live network, as described above, thus bypassing the approximations inherent in simulations.

The above examples have focused on the cell coverage, rather than the capacity or another performance metric. Cell coverage versus cell count is described as only an exemplary performance metric, inhomogeneity also plays a substantial role in the tradeoff between cell count and capacity. Inevitably there will be some tradeoff between the cell count, coverage, and capacity which will be influenced by inhomogeneity in the network, as demonstrated by the above exemplary tradeoff between cell count and coverage. Thus, the inventors have demonstrated that the coverage cost of cell deletion is likely to be lower in an inhomogeneous network, than in a regular or ideal network, and have illustrated such a tradeoff when upgrading technology in an overlay network.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of determining cells for deletion in a network design, comprising:
    simulating operation of the network to generate statistics for each cell of a given group of cells, said generated statistics including at least one of a number of soft handoff legs for each cell of the group, total active legs for each cell of the group, and total number of simplex and softer-handoff legs for each cell of the group;
    evaluating statistics of each cell based on a ratio of soft handoff legs to total active legs;
    ordering cells of the group by rank based on the evaluation, said ordering including ranking the cells in order of highest ratio of soft handoff legs to total active legs, the highest ranked cell being the cell with the highest ratio; and
    deleting the highest ranked cell from the network.

2. The method of claim 1, wherein only a single simulation of the network is performed to determine cells for deletion.

3. The method of claim 1, wherein said simulating, evaluating, ordering and deleting are repeated until a desired number of N cells are deleted.

4. The method of claim 1, wherein the network design is applicable to determining site selection of cells for an initial network deployment.

5. The method of claim 1, wherein the network design is applicable to determining cells for deletion as part of a network overlay or upgrade of an existing network.

6. A method of determining cells for deletion in a network design, comprising:
    simulating operation of the network to generate statistics for each cell of a given group of cells;
    a first evaluating statistics of each cell based on a given criteria ranking;
    a second evaluating a network parameter related to deletion of the highest ranked cell against a given screening criteria to determine the influence the deleted cell has on the network;
    ordering cells of the group by rank based on the evaluation; and
    allowing deletion of the highest ranked cell if the network parameter satisfies the screening criteria, else rejecting the deletion of the highest ranked cell.

7. The method of claim 6, further comprising repeating the second evaluating, rejecting and deleting steps until the network parameter for a given cell deletion candidate satisfies the screening criteria, or until a desired number of N cells are deleted.

8. The method of claim 7, further comprising:
    terminating the method if no deletion candidate passes the screening criteria.

9. The method of claim 7, further comprising:
    accepting the original highest ranked cell for deletion, if no deletion candidate passes the screening criteria, and
    repeating said simulating, evaluating, ordering and deleting for N deletions.

10. The method of claim 6, wherein said second evaluating further includes re-simulating the network without the highest ranked cell to obtain the network parameter.

11. The method of claim 6, wherein the network parameter is cell coverage and the screening criteria is whether deletion of the highest ranked cell reduces the normalized cell coverage by less than P%.

12. The method of claim 6, wherein the network parameter is cell capacity and the screening criteria is whether deletion of the highest ranked cell reduces a normalized network capacity by less than P%.

13. The method of claim 6, wherein
    the network parameter is area coverage and the screening criteria is whether a particular area is covered, and
    the highest ranked cell or another cell deletion candidate is rejected if the area is not covered.

14. A method of selecting one or more cells for deletion in a network design, comprising:
    first evaluating, for each cell of a given group of cells, statistics generated from a network simulation based on a given ranking criteria;
    ordering cells of the group by rank based on the first evaluation;
    deleting the highest ranked cell;
    second evaluating a network parameter related to deletion of the highest ranked cell against a given screening criteria to determine the influence the deleted cell has on the network, said second evaluating including:
        re-simulating the network without the highest ranked candidate cell to obtain the network parameter,
        allowing deletion of the highest ranked cell if the network parameter satisfies the screening criteria, else
        rejecting the deletion of the highest ranked cell.

15. The method of claim 14, wherein said second evaluating, rejecting and deleting are repeated until the network parameter for a given cell deletion candidate satisfies the screening criteria, or until a desired number of N cells are deleted.

16. The method of claim 15, further comprising:
    terminating the method if all cell deletion candidates fail the screening criteria or after Q attempts to determine a candidate that passes the screening criteria.

17. The method of claim 15, further comprising:
    accepting the original highest ranked cell for deletion, if all cell deletion candidates fail the screening criteria or if no deletion candidate passes the screening criteria after Q iterations of said re-evaluating, and
    repeating said first evaluating, ordering and deleting until a desired number of N cells are deleted.

18. The method of claim 14, wherein the network parameter is area coverage and the screening criteria is whether the deletion of the highest ranked cell reduces normalized cell coverage by less than P%.

19. The method of claim 14, wherein the network parameter is cell capacity and the screening criteria is whether the deletion of the highest ranked cell reduces normalized capacity by less than P%.

20. The method of claim 14, wherein the network design is applicable to determining site selection of cells for an initial network deployment, or applicable to determining cells for deletion as part of a network overlay and upgrade of an existing network.

21. A method of determining cells for deletion as part of a network upgrade of an existing, live network, comprising:
    generating actual network data for each cell of a given group of cells of the live network;
    evaluating the generated data of each cell to a ratio of soft handoff legs to total active legs;
    ordering cells of the group by rank based on the evaluation, said ordering including ranking the cells in order of highest ratio of soft handoff legs to total active legs, the highest ranked cell being the cell with the highest ratio; and
    deleting the highest ranked cell from the live network.

22. The method of claim 21, further comprising:
collecting revised network statistics for each cell after deletion of the highest ranked cell from the network, and
determining the influence that the deleted highest ranked cell has on the network based on the collected statistics.

23. The method of claim 21, further comprising:
repeating said generating, evaluating, ordering and deleting N times to delete N total cells.

24. A method of accounting for the effects of inhomogeneity inherent in an actual network when evaluating a desired cell coverage, comprising:
taking into account one or more of terrain of the proposed network, non-uniform traffic distribution within the proposed network, potential clutter in the proposed network and site selections requirements introduced by potential real estate and zoning requirements for the proposed network;
ranking cells based on a comparison of statistics generated, for each cell, to ratio of soft handoff legs to total active legs; and
deleting the highest ranked cell.

25. The method of claim 24, wherein only a single simulation of the proposed network design is performed to determine a cell for deletion.

26. The method of claim 24, further comprising:
generating said statistics from one of a network simulation of the proposed network, or based on actual network data for each cell of a given group of cells in a live network.

27. The method of claim 24, wherein the proposed network design is a design for an initial network deployment or a network overlay and upgrade design for an existing network.

28. A method of determining cells for deletion in a network design, comprising:
simulating operation of the network to generate statistics for each cell of a given group of cells, said generated statistics including statistics related to at least one of a number of soft handoff legs for each cell of the group, total active legs for each cell of the group, and total number of simplex and softer-handoff legs for each cell of the group;
evaluating statistics of each cell based on a total number of simplex and softer-handoff legs per cell;
ordering cells of the group by rank based on the evaluation, said ordering including ranking the cells in order of lowest number of simplex and softer-handoff legs, the highest ranked cell being the cell with the lowest number of simplex and softer-handoff legs; and
deleting the highest ranked cell from the network.

29. A method of determining cells for deletion in a network design, comprising:
simulating operation of the network to generate statistics for each cell of a given group of cells, said generated statistics including one of data for bins of area covered by each cell or data for each mobile user in proximity to each cell;
evaluating the statistics of each cell based on a threshold value for the bin data or mobile user data, the evaluating including comparing the bin data or mobile user data for each given cell to the threshold;
ordering cells of the group by rank based on the evaluation, said ordering including ranking the cells in order of the degree at which the bin data or mobile user data for a given cell exceeds the threshold, the highest ranked cell being the cell having bin data or mobile user data exceeding the threshold to the highest degree; and
deleting the highest ranked cell from the network.

30. A method of determining cells for deletion in a network design, comprising:
simulating operation of the network to generate statistics for each cell of a given group of cells, said generated statistics including one of data for bins of area covered by each cell or data for each mobile user in proximity to each cell;
evaluating statistics of each cell based on said generated statistics to estimate the impact of cell deletion on a population of mobiles or bins in proximity to such cell, and said evaluating including calculating a communication parameter for one or more of the mobiles or bins in proximity to the cell;
ordering cells of the group by rank based on the evaluation, said ordering including ranking the cells in order of the lowest adverse effect on a given mobile population or bins in an area, based on the evaluation of the calculated communication parameter; and
deleting the highest ranked cell from the network.

* * * * *